US008843315B1

(12) United States Patent
Barbeau et al.

(10) Patent No.: US 8,843,315 B1
(45) Date of Patent: Sep. 23, 2014

(54) SYSTEM AND METHOD FOR SPATIAL POINT-OF-INTEREST GENERATION AND AUTOMATED TRIP SEGMENTATION USING LOCATION DATA

(75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US);
Narin Persad, Hollywood, FL (US)

(73) Assignee: University of South Florida, Tampa, FL (US)

( * ) Notice: Subject to any disclaimer, the term of this patent is extended or adjusted under 35 U.S.C. 154(b) by 314 days.

(21) Appl. No.: 13/536,115

(22) Filed: Jun. 28, 2012

Related U.S. Application Data

(60) Provisional application No. 61/502,061, filed on Jun. 28, 2011.

(51) Int. Cl.
*G01C 21/26* (2006.01)
*G01C 21/00* (2006.01)

(52) U.S. Cl.
USPC .............................................. 701/486; 701/1

(58) Field of Classification Search
CPC ........ G01C 21/26; G01C 21/00; G01C 21/08; G01S 19/05; B64G 1/1014
USPC ....................................................... 701/1, 486
See application file for complete search history.

(56) References Cited

U.S. PATENT DOCUMENTS

| | | | |
|---|---|---|---|
| 2003/0100993 A1 | 5/2003 | Kirshenbaum et al. | |
| 2004/0181495 A1* | 9/2004 | Grush | 705/417 |
| 2005/0065711 A1 | 3/2005 | Dahlgren et al. | |
| 2009/0036145 A1* | 2/2009 | Rosenblum | 455/456.3 |
| 2014/0135040 A1* | 5/2014 | Edge et al. | 455/456.6 |

* cited by examiner

*Primary Examiner* — Ian Jen
(74) *Attorney, Agent, or Firm* — Molly Sauter; Smith & Hopen, P.A.

(57) ABSTRACT

This present invention is a spatial data processing system and method that allows the automatic, rapid, scalable analysis and transformation of large amounts of travel behavior data (e.g., tracking data points) into individual "points-of-interest" and discrete trips stored in a spatial database. Each trip has a point-of-interest as a starting and ending location, and contains multiple positions (e.g. latitude and longitudes) which define the travel path of the user/device during that time period.

21 Claims, 7 Drawing Sheets

Algorithm 1 Partition algorithm

Input: $v := T \to root$, a timestamp $\kappa$, and a node array $C$ where $C[0] < \kappa$ and $C[1] > \kappa$. $C[1]$ or $C[0]$ can be initialized to a root of another tree, provided the user is aware of the constraints or they must both be null.

Output: an array $A[] = \{\alpha \to root, \beta \to root\}$ of the roots of two trees $\alpha$ and $\beta$ such that $\forall v \in \alpha, v.key < \kappa$ and $\forall v \in \beta, v.key > \kappa$ procedure PARTITION($v, \kappa, C$)
        if $v$ is null then
            return $v$
        end if
        direction= $\kappa < v.key$?left:right
        $A[] :=$ PARTITION($v \to direction, \kappa, C$)
        if direction is left then
            $A[1] \leftarrow$ JOIN($T_{v \to right}, T_{A[1]}$)
            insert v into $T_{A[1]}$
        else
            $A[0] \leftarrow$ JOIN($T_{v \to left}, T_{A[0]} \to root$)
            insert v into $T_{A[0]}$
        end if
        return A
    end procedure

Fig. 4

Algorithm 2 Merge

Input: nodes v and q, where q is the root of some tree whose nodes are bounded by $min(T_v), max(T_v)$.

Output: $T_{v+q} \to root$ procedure MERGE(v, q)
        if q is null then
            return v
        end if
        if v is null then
            $taller \gets true$
            return v
        end if
        direction= $q.key < v.key$?left:right
        if $v \in \{min(T_q), max(T_q)\}$ and v is not terminal then
            break$T_q$ into left and right subtrees, $T_{q_r}, T_{q_l}$
            insert q into $T_v$
            $T_v \to root \gets$ MERGE($T_v \to root, T_{q_l}$)
            $T_v \to root \gets$ MERGE($T_v \to root, T_{q_r}$)
            return $T_v \to root$
        else
            node u=MERGE($v \to direction, q$)
            return JOIN($T_v, T_u$)
        end if
    end procedure

Fig. 5

Algorithm 3 Cluster algorithm

1: procedure CLUSTER($(v_1, v_2, \ldots, v_N), \epsilon$)   ▷ $\epsilon$ is distance threshold
2:     for $v_{i=1}, \ldots, v_N$ do
3:         for $v_{j=i+1}, \ldots, v_N$ do
4:             if $d(v_i, v_j) < \epsilon$ then
5:                 if $T_i \to max < T_j \to min$ then
6:                       $union(T_i, T_j)$
7:                 else if $T_j \to max < T_i \to min$ then
8:                       $union(T_i, T_j)$   ▷ Perform the symmetric operations in [11] by replacing RH with LH, and going left instead of right
9:                 else if $T_i \to min < T_j \to min < T_j \to max < T_i \to max$ then
10:                     $Merge(T_j, T_i)$
11:                 else if $T_i \to min < T_j \to min < T_i \to max < T_j \to max$ then
12:                     partition $T_j$ by $T_i \to max$
13:                     $union(T_i, T_\beta)$ (as in line 7)
14:                 else if $T_j) \to min < T_i \to min < T_i \to max < T_j \to max$ then
15:                     do the same as in line 13
16:                 else if $T_j \to min < T_i \to min < T_j \to max < T_i \to max$ then
17:                     partition $T_j$ by $T_i \to min$
18:                     $union(T_i, T_\alpha)$ (as in line 9)
19:                 end if
20:             end if
21:         end for
22:     end for
23: end procedure

Fig. 6

TABLE I
DBSCAN vs Fast GNSS Clustering

|  | DBScan (Weka) | Fast GNSS |
|---|---|---|
| Memory storage for $N$ points | $O(N^2)$ | $O(N)$ |
| Running time on N points | $O(N^2)$ | $O(N^2 \log N)$ |
| Distance matrix required to avoid re-computations | Yes | No |
| insertion into (n sized) cluster | $O(1)$ | $O(\log n)$ |
| Noise Reduction | Yes | No |
| (Temporally) Ordered clusters | No | Yes |
| Finds arbitrary cluster shapes | Yes | Yes |
| Noise detection | Yes | No |

Fig. 7

TABLE II
EXECUTION TIME IN SECONDS

| number of points | Fast GNSS | DBScan |
|---|---|---|
| 1006 | 0.4 | 0.8 |
| 2058 | 1.4 | 3.4 |
| 2384 | 1.9 | 5.5 |
| 2639 | 2.3 | 5.9 |
| 2774 | 2.6 | 7.1 |
| 4463 | 7.9 | 18.0 |
| 4478 | 6.8 | 16.5 |
| 4641 | 7.3 | 19.3 |
| 5216 | 9.3 | 24.5 |
| 6027 | 12.6 | 31.5 |

Fig. 8

SYSTEM AND METHOD FOR SPATIAL POINT-OF-INTEREST GENERATION AND AUTOMATED TRIP SEGMENTATION USING LOCATION DATA

CROSS-REFERENCE TO RELATED APPLICATIONS

This application claims priority to currently U.S. Provisional Patent Application No. 61/502,061, filed on Jun. 28, 2011, entitled "System and Method for Spatial Point-of-Interest Generation and Automated Trip Segmentation Using Location Data".

STATEMENT OF GOVERNMENT INTEREST

This invention was made with Government support under FDOT BDK85 TWO 977-14 awarded by the Federal Department of Transportation. The Government has certain rights in the invention.

BACKGROUND OF INVENTION

Global Navigation Satellite Systems (GNSS) are becoming increasingly ubiquitous in both military and civilian applications for tracking the movement of people and goods. However, as millions of GNSS receivers are being monitored at frequencies up to one per second, location-aware information systems struggle to quickly process overwhelming amounts of location data and transform this information in actionable intelligence.

GPS enabled mobile phones supply data which could be used for analyzing traffic patterns and also provide a means of receiving notifications. Market research expects GPS device shipments alone to have a compound annual growth of more than 25% through 2013. Additionally, global penetration of GNSS in mobile phones is expected to surpass 50% by 2015. Given that there were an estimated 5.3 billion moile phone subscribers at the end of 2010, the number of GNSS-enabled mobile phones emerging over the next few years will be staggering.

Accordingly, what is needed in the art is a system and method designed to rapidly analyze raw GNSS position tracking data which maintains the spatial and temporal properties of the data associated with the movement of the user from one point-of-interest to another.

SUMMARY OF INVENTION

The present invention provides an unsupervised method for fast GNSS cluttering of data which quickly translates a large collection of GNSS position data into a series of Points-of-Interest (POIs), which define spatial dimensions where a user has stopped for a significant amount of time, and trips, which define the spatial and temporal properties for movement from one POI to another. The method of the present invention uses a balanced binary tree to represent a cluster and exploits the properties of binary trees to perform merges between two clusters in logarithmic running time, and maintain a O(n) memory storage requirement during execution. The fast GNSS clustering method of the present invention is also capable of merging disjointed ambiguously-related trees when no exact relationship exists. The method of the present invention avoids the scalability pitfalls of hierarchical clustering algorithms and is specifically designed to handle moderately large tracking databases, where a single days worth of data for one user can total more than 1000 points after pre-processing.

The present invention provides a method of generating a travel history for a user from a set of global navigation satellite system (GNSS) data for the use. The method may include, acquiring a set of time-stamped GNSS data recorded by a user's mobile device, the time-stamped GNSS data comprising spatial and temporal information, defining a plurality of temporarily ordered points-of-interest (POI) for the user based upon the acquired set of time-stamped GNSS data, wherein each of the plurality of POIs defines a spatial dimension where the user has stopped for a significant amount of time and identifying a plurality of trips taken by the user between the plurality of defined POIs to generate a travel history for the user, wherein each of the plurality of trips originates and terminates at one of the plurality of POIs and wherein each of the plurality of trips defines a spatial and temporal property for movement between two of the plurality of POIs. The merging of the POIs is performed in logarithmic running time, while maintaining an O(n) memory storage requirement during execution.

An embodiment of the present invention may include a non-transitory computer readable storage medium having a method encoded thereon for performing the inventive method.

Another embodiment of the present invention may include, a computer system comprising a central processing unit for generating a travel history for a user from a set of global navigation satellite system (GNSS) data for the user by acquiring a set of time-stamped GNSS data recorded by a user's mobile device, the time-stamped GNSS data comprising spatial and temporal information, defining a plurality of temporarily ordered points-of-interest (POI) for the user based upon the acquired set of time-stamped GNSS data, wherein each of the plurality of POIs defines a spatial dimension where the user has stopped for a significant amount of time and identifying a plurality of trips taken by the user between the plurality of defined POIs to generate a travel history for the user, wherein each of the plurality of trips originates and terminates at one of the plurality of POIs and wherein each of the plurality of trips defines a spatial and temporal property for movement between two of the plurality of POIs and a memory unit coupled to the central processing unit, the memory unit having a an O(n) memory storage requirement.

The present invention uses a balanced binary tree to represent a cluster (POI) and exploits the properties of binary trees to perform merges between two clusters in logarithmic running time, while maintaining an O(n) memory storage requirement during execution.

BRIEF DESCRIPTION OF DRAWINGS

FIG. 4 illustrates an exemplary partition algorithm in accordance with the present invention.

FIG. 5 illustrates an exemplary merge algorithm in accordance with the present invention.

FIG. 6 illustrates an exemplary clustering algorithm in accordance with the present invention.

FIG. 7 is a table illustrating the results of DBScan vs. the method of the present invention.

FIG. 8 is a table illustrating the execution time of DBScan vs. the method of the present invention, in seconds.

DETAILED DESCRIPTION OF INVENTION

Figure 1:
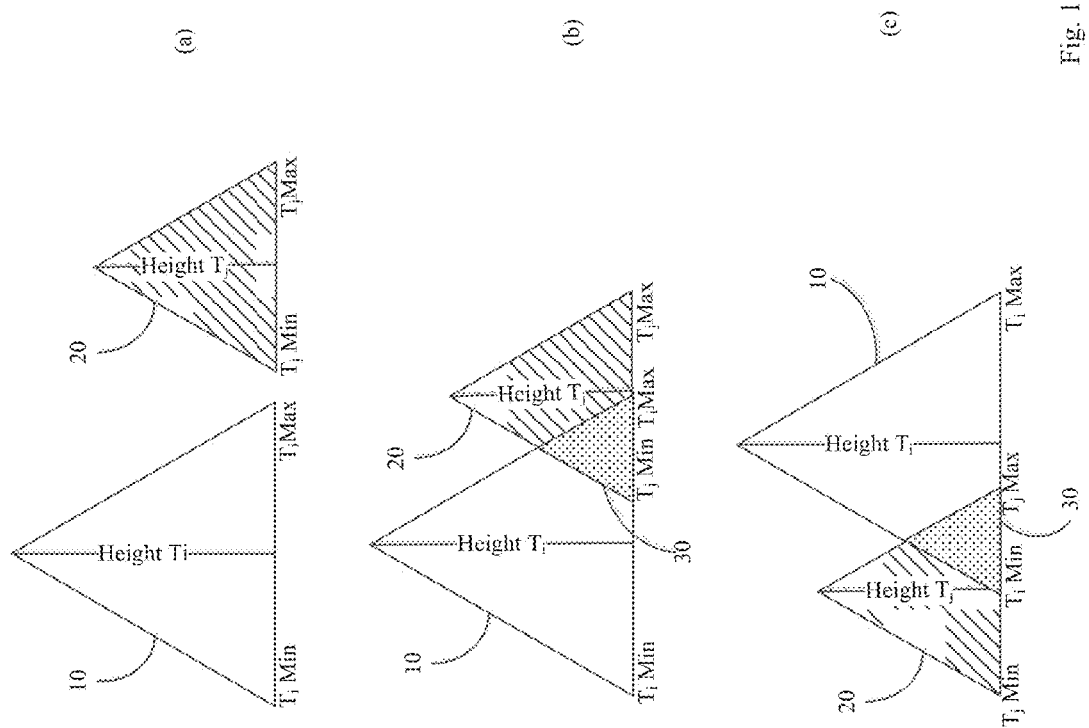
FIG. 1 is a diagram illustrating an ideal relationship in the database (a) and two overlapping ranges (b) and (c).

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The software by also be part of computer system and may be stored on a non-transitory computer readable medium prior to execution. The following detailed description is, therefore, not to be taken in a limiting sense.

The present invention is a system and method that is able to automatically generate spatial points-of-interest and trip information from raw location data, such positions calculated using Global Positioning Systems (GPS), that are recorded by a mobile positioning device, such as a GPS-enabled cell phone.

The method of the present invention identifies POI (points of interest) where a user may have lingered in their trip. The input of the clustering method of the present invention is a session which consists of a set of time-stamped GPS points recorded by a user's mobile device (i.e. mobile phone) over a duration of time. As such, POIs detected in a single session might include the user's home, place of work, or recreational area. The remaining unclustered points in the session dataset exist between POIs and can be considered a trip (i.e. a segment which joins an origin POI and a destination POI). Thus, as the user's travel history is being recreated from the acquired dataset, it is necessary to know at what time a user arrived at and departed from a POI. If one cluster ID was assigned to all points within a cluster then this could easily be done by iterating through the original set of points and finding the first and last points within a give cluster ID provided the points in the original set were stored in temporal order.

The temporarily-ordered balanced binary tree resulting from the present invention has added benefit that the maximum and minimum times can be retrieved in O (log n), which is useful for database insertions which have to be executed in order to assign auto generated keys to some element(s) in the cluster. The present design exploits the logarithmic structure of a binary tree to perform various operations which are used to merge two AVL trees. Each element (point) in the dataset is indexed so that the algorithm can compute d (i, j), the distance between $v_i$ and $v_j$.

The following notation will be used in the remainder of the specification:

To refer to an indexed pair on points, (i, j) is used where i and j are to indexes of the points/nodes.

$v_k$ denotes the node of the coordinate indexed at k=i, j $T_k$ denotes an AVL tree in which a node $v_{k=i,j}$ resides, but is not necessarily rooted at

|T| is the size of the tree T h(T) is the height of the tree T

As T is a temporally ordered tree, $max(T_k)$ and $min(T_k)$ denote the maximum and minimum times respectively of T i+j represents a merge between two trees of the indexed elements i and j The method of the present invention uses a single-link agglomerative clustering in which $d(v_i, v_j)$ is computed for all $(v_i, v_j)$. However, the present invention does not update any matrices, such as a distance matrix or a table which identifies the cluster membership of the points in the data set. In the present invention, a great circle distance is used to compute the distance between a pair of points $(v_i, v_j)$. In accordance with the single-link hierarchical clustering, there are $O(n^2)$ distance computations. For each $(v_i, v_j)$ pair, the two clusters in which $v_i$ and $v_j$ reside are immediately merged by performing a union on $\hat{T}_i$ and $\hat{T}_j$ using a join algorithm. If $\hat{T}_i \rightarrow root \rightarrow data = \hat{T}_j \rightarrow root \rightarrow data$, and $v_j$ are necessarily in the same cluster, specifically $v_i, v_j \in \hat{T}_{i+j}$ so no merging is executed.

Let $\{v_k\}$, k=1, . . . , $|T_i|$, $v_k < v_k+1$, be the monotonically increasing sequence over all nodes in T. Let $\{q_k\}$, k=1, . . . , $|T_j|$, $q_k < q_k+1$, be the monotonically increasing sequence over all nodes in $T_j$. Let $\{q_{nk}\}$ be the longest sub-sequence of $\{q_k\}$, where $\{n_k\}$ is a monotonically increasing sequence over the index set $\{k=1, \ldots, |T_j|\}$, such that $q_{nk} > M$ and $q_{nk} < N$ for M, N $\in \{v_k\}$. $\{q_{nk}\}$ is the longest possible subsequence of $\{vk\}$ bounded by the times of two points in m, N $\in \{vk\}$. Then the criteria to use the union function in is not satisfied. In other words, there is a partial (or complete) overlap between the range of Tj and the range of Ti, as shown with reference to FIG. 1. There are two processes provided in accordance with the present invention to facilitate merging Ti and Tj.

In the following method steps described, it is assumed that the GNSS data being processed is from a single user and that all timestamps for individual location data points are unique.

With reference to FIG. 1, the partition algorithm removes $\{q_{nk}\}$ triangle 30, from $T_j$ 10 so that the necessary criteria between $T_i$ 20 and (the modified) $T_j$ 10 are satisfied. As $\{q_{nk}\}$ is the collection of nodes of $T_j$ 10 that overlaps $T_i$ 20, removing it would induce the necessary criteria between the two trees. Specifically, let $q_{n0} = min(\hat{T}_j)$, M=$min(\hat{T}_i)$. Let $q_{nK}$ be the last node of $\{q_{nk}\}$ such that $q_{nK} < max(\hat{T}_j)$ and $q_{nK} < N = max(\hat{T}_i)$, resulting in the second relationship illustrated in FIG. 1(b). An exemplary embodiment of the partition algorithm is illustrated with reference to FIG. 4.

The partition algorithm of the present invention is similar to a recursive binary search where a tree is recursively searched for a given key. The partition algorithm is given a key κ which it attempts to find in $\hat{T}_j$. This key κ will be a timestamp that is unique to $\hat{T}_i$, either N or M. N or M would be chosen according to FIG. 1(b) and FIG. 1(c). Since none of the nodes in $\hat{T}_j$ will have the value of κ as their key, the algorithm will reach a terminal node. As the partition algorithm is recursive the algorithm can discriminate between nodes that have a key value greater than κ or a key value less than κ. By the property of a binary tree, if v→data<κ then every node in the subtree rooted at its left child will be too, recall that data for a node in the tree is a timestamp. Similarly, if v→data>κ then the subtree rooted at its right child will have node with keys greater than κ. Thus, by traversing the binary tree, we can partition the tree into two trees $T_\alpha = \{\forall v \in T_\alpha : v < \kappa\}$, and $T_\beta = \{\forall v \in T_\beta : v > \kappa\}$. With reference to FIG. 1, $T_\alpha$ and $T_\beta$ would correspond to triangle 20 and triangle 30 segments of $\hat{T}_j$. Thus, either $T_\alpha = \{q_{nk}\}$ or $T_\beta = \{q_{nk}\}$, depending upon $\kappa$. The partition algorithm always assumes that $h(j) \leq h(i)$. $\kappa$ is set to the time $N = \max(\hat{T}_i)$ or $M = \min(\hat{T}_i)$. The actual value of $\kappa$ will depend upon the relationship between the maximum and minimum nodes of $\hat{T}_j$ and $\hat{T}_i$ given in FIG. 1. An exemplary partition algorithm in accordance with the present invention is illustrated with reference to FIG. 2.

Regardless of how far the algorithm has to search for $\kappa$ (the left or right vertexes along the based of triangle 30 in FIG. 1, the running time is always bounded by $|\hat{T}_j|$ (before modifications) because $|\{q_{nk}\}| \leq |\hat{T}_j|$ (i.e. triangle 30 is bounded by $T_j$ in FIG. 1) Furthermore, even if for example, $|\{q_{nk}\}|=1$, by algorithm would still construct $T_j$ by agglomerating its remaining nodes from the bottom up. If $\{q_{nk}\} = \hat{T}j$, then $|\{q_{nk}\}| = |\hat{T}j|$ and the running time is still bounded by $|\hat{T}j|$. The time complexity then is bounded by the cost of reconstructing $T_j$.

$$T(n) = \begin{cases} \theta(1) & \text{for } 1 \leq n \leq 2 \\ T(n/2) + \theta(\log(n)) & \text{for } n > 2 \end{cases}$$

here $n = |T_j|$. Solving this recurrence relation using the Akra-Bazzi theorem gives the solution $\theta(\log^2(n))$. The Akra-Bazzi theorem is a generalization of the master method which solves recurrences with more general functions for $f(n)$ and subproblems of unequal size.

Figure 2:
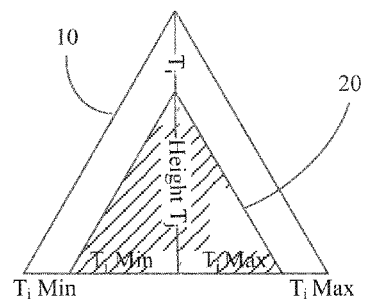
FIG. 2 is a diagram illustrating how $T_j$'s nodes are bounded above and below by $h(T_j) \le h(T)$.

The final procedure is executed when $T_j$ is entirely bounded by two points (timestamp data) in $T_i$, when $\{q_{nk}\} = \{q_k\}$ so that $M \leq \min(T_i) < q_{no} = \min(T_j) < \ldots < q_{nK} = \max(T_j) < N \leq \max(T_i)$, as shown with reference to FIG. 2.

Figure 3:
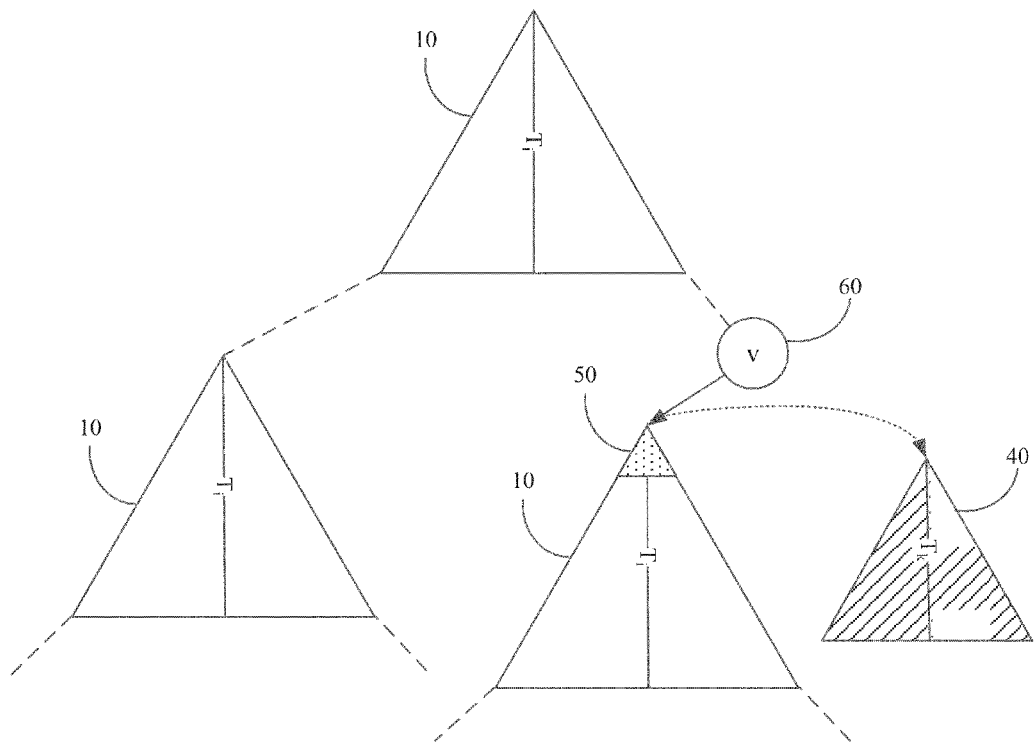
FIG. 3 is a diagram illustrating $T_{k=j}$ is merged with the subtree rooted at the child (upper dotted triangle) of v opposite the search direction.

The merge procedure tries to find a node $v \in \hat{T}_i$ such that $v \in (q_{n0}, q_{nK})$ If $v$ is a terminal node, remove $v$ from $\hat{T}_i$ (by removing the reference to its parent) and insert it into $\hat{T}_j$ Then, for each return back to the root we union $T_j$ with the subtree rooted at the child of $v$ opposite the search direction. Finally, insert $v$ into the new $\hat{T}_k$, as shown with reference to FIG. 3. An exemplary embodiment of the merge algorithm is illustrated with reference to FIG. 5.

If $v$ is not a terminal node insert $\hat{T}_j \to \text{root}$ into $T_v$, break $\hat{T}_j$ into its left and right subtrees and call the algorithm recursively on both subtrees. Note that by calling the algorithm recursively using $T_v \to \text{root}$ we avoid having to traverse $\hat{T}_v$ again.

In an analysis of the time complexity, let $$n = |T_i|$$

and $$m = |T_j|.$$

operates on a portion of $T_i$ in each recursion. For instance if $v \in (\min(\hat{T}_k), \max(\hat{T}_k))$ but $v$ is not terminal then the algorithm will operate on $T_v$ in the next recusion until $v$ is some terminal node which satisfies the condition $v \in (\min(\hat{T}_k), \max(\hat{T}_k)$ or $T_k$ is exhausted through deletion. The length of the path to a satisfactory $v$ is $O(\log n)$. For the best and worse case running times we assume that $\log n \leq m$.

The best case scenario is that the first $v$ such that $v \in (\min(\hat{T}_k), \max(\hat{T}_k))$ is a terminal node. $\hat{T}_k$ is then merged with the subtree rooted at the child in the opposite search direction. As we attach $\hat{T}_k$ at some terminal node in $\hat{T}_i$, n will only increase returning to the root. Recall that n will increase because $\hat{T}_k$ will be merged with $T_{v \to opp}$, where opp is the direction opposite the search direction. The recursive formula for the best case running time is $T(n) = T(n/2) + \theta(\log(n+m))$. It takes $O(\log n)$ to find $v$, so solving this recurrence gives $$O\left(\sum_{i=0}^{\log n} \log\left(\frac{n}{2^i} + m\right)\right).$$

Thus, the best case running time is $O(\log(n)) * \log(n+m)$.

In the worst case $\forall v \in \hat{T}_i$, $\sqcup (\min(\hat{T}_k), \max(\hat{T}_k))$, then in each recursion, the root of $T_k$ is inserted in $T_v$, and the algorithm is called recursively on $T_{v \to \text{left}}$ and $\hat{T}_{v \to \text{right}}$. As the size of $\hat{T}_i$ will grow by 1 m times, the running time is $\log((n+1)(n+2) \ldots (n+m)) < m \log 2n \in O(m \log n)$. This cost also includes the time $2 \log n+i$, $i=0 \ldots m-1$, to find $v$ and insert $T_j \to \text{root}$ for each recursion, and the time $O(\log n+i)$ to union the left and right subtrees of $v$.

If the assumption were not made that $\log n \leq m$ then the worst case running time would simple be given by $O(\max(m, \log n) * \log(n))$.

Let $n = |T_i|$ and $m = |T_j|$. Finding the final set of clusters requires iterating through $$\frac{N(N-1)}{2}(i, j)$$

pairs, computing the distance between them, and merging $\hat{T}_i$ and $\hat{T}_j$ if they are disjoint. Because $v_{k=i,j}$ will not necessarily be the root of $\hat{T}_k$ the algorithm always travels up the tree (until the parent pointer is null) before it merges two trees. For instance, if a node is added to a tree it might end up as a terminal node. A exemplary embodiment of the cluster algorithm of the present invention is illustrated with reference to FIG. 6.

In a time complexity analysis, because only disjoint clusters are merged, there could be at most N mergers. As $\max(m, \log n) * \log(n) < N \log N$ for all $(T_i, T_j)$, the worst case time spent to find the final set of clusters is $O(N^2 \log N)$.

In an experimentally comparison, the method of the present invention was compared to another method currently known in the art, DBScan. DBScan was selected because of DBScan's fast running time. DBScan is widely used in clustering applications for its efficiency and noise reduction filtering. Both algorithms were executed on an 2.0 GHz AMD Athlon™ 64 X2 Dual Core Processor 3800+ with 2.00 GB of RAM. We modified the DBScan in to use great circle distance rather than euclidean distance for our testing purposes. Both algorithms received the same sequence of session data as input. The running time of the DBScan implementation is $O(n^2)$. The table shown in FIG. 7 compares a few attributes of both algorithms.

The results of clustering some of the largest datasets consisting of unique (times stamped) points are presented in Table II of FIG. 8. A single dataset consists of time stamped GPS points recorded from a single user in one session.

The results show that the method of the present invention (referred to as Fast GNSS Clustering) is faster than DBScan. For Fast GNSS, in accordance with the method of the present invention, ordering the GPS points is crucial because it reduces the number of bounded merges that need to be performed to merge $T_i$ and $T_j$. By ordering the points the algorithm is more likely to build a cluster in temporal order so that when two trees are to be merged they benefit from being disjoint. The results demonstrate that the worst-case running time, $O(n^2 \log n)$, we estimate for Fast GNSS Data clustering is an overestimation for inputs of our size because DBScan has a running time of $O(n^2)$ but our algorithm outperformed DBScan, sometimes by several seconds on all inputs. For both algorithms, the clusters that were found were identical as expected. DBScan's noise detection capability may or may not be beneficial depending on the duration of the time spent at the POI. For instance, a two point cluster could very well have a duration of time that is significant enough to be considered a legitimate POI if GPS signal coverage is weak in that location.

One consequence of the FAST GNSS Clustering of the present invention lacking noise reduction has been the identification of smaller clusters, or pseudo-POIs, that dont actually represent a location where a person performed an activity. Instead, pseudo-POIs typically identify a location where a person has briefly hesitated during travel, often as a result of a traffic delay when traveling on roads. For pedestrian data, pseudo-POIs often occur as users are waiting for pedestrian crosswalk signals at traffic lights. While pseudo-POIs are actually undesirable in terms of creating POIs and trips, this data could provide insight into traffic delays to aid in traffic signal retiming, road construction and enhancement, and even locations where advertising is most likely to be visible to a traveler. The duration of exposure to advertising could even be measured, since the direction the user is facing during travel is also known from the GNSS data.

Figure 9:
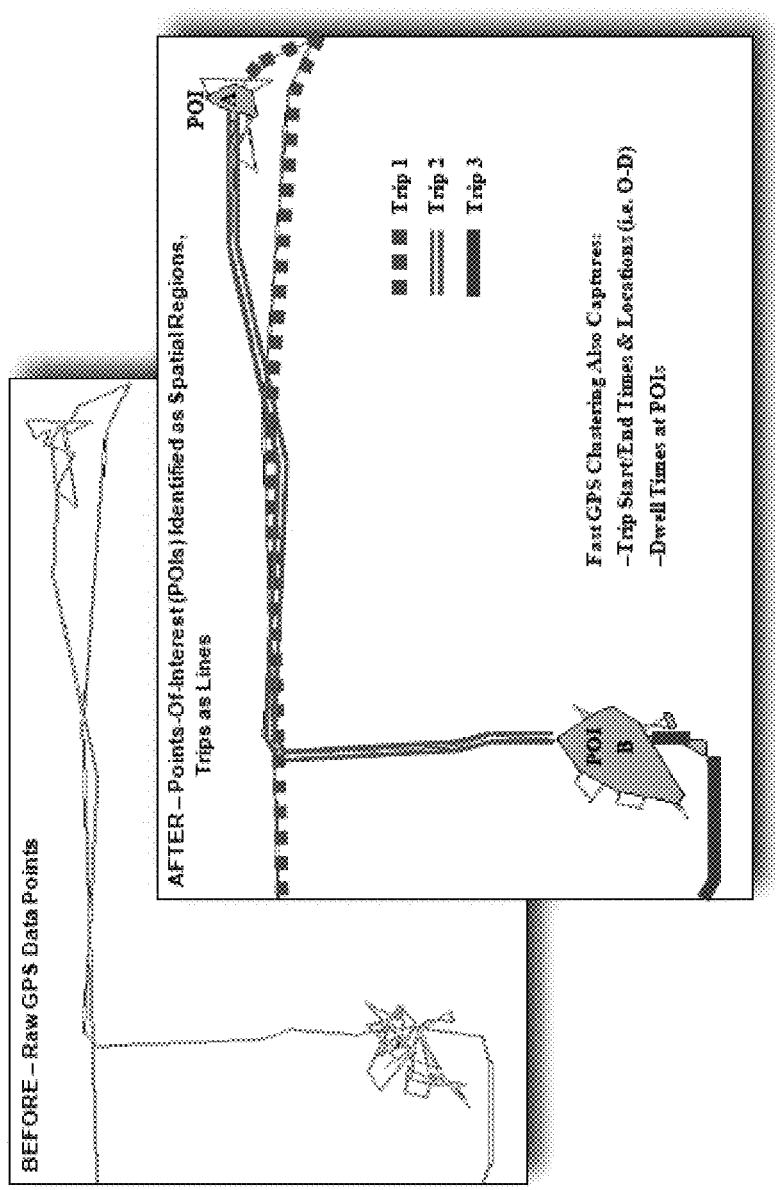
FIG. 9 illustrates the results for clustering and trip segmentation resulting from the execution of the method of the present invention.

FIG. 9 illustrates the both image of raw GPS data (background slide) that was connected with lines, as well as the image showing the results of the Gast GPS Clustering and Trip Segmentation method of the present invention (foreground slide). In this example, two POIs (i.e., POI A and POI B), were identified as well as three trips (i.e., Trip 1, Trip 2 and Trip 3). The end result in the database for this dataset would be two new records in a location table, one for each POI, as well as three new trips in a trips table. The spatial attributes of the data may also be saved in a PostGIS spatial database, with POIs being represented as polygons and trips as polylines.

The primary reason for Fast GNSS in accordance with the present invention is to build a travel record for the user. Two operations may be executed on the user's point set, (1) inserting clusters into a database and (2) extracting trips from the database.

Finding the clusters from the user's points is required to construct and insert a record in a database that represents the cluster. This record would include information such as a unique clusterID, the arrival and departure times as well as a spatial polygon which is built by creating a string of points representing the (lat, long) pairs and inserting it into a spatial database. We can iterate through the cluster in $O(n)$ using a level order traversal to construct the geospatial string. A level order traversal does not use the temporally ordered property of the cluster. The temporal ordering is used when we need to retrieve the starting and ending times which is done in $O(\log n)$. With an unordered clustering approach, for example DBScan, this would take $O(n \log n)$, where n is the size of the cluster, using an optimal sorting algorithm such as mergesort to temporally sort the unordered cluster. The advantage of Fast GNSS is that the temporal ordering is persisted throughout the execution of the algorithm which eliminates the need to do any post processing such as executing sorting algorithms on the extracted clusters. Of course, instead of mergesort the first element within a cluster could be found by iterating through the set of input points until the first point with the clusterID is reached but this would require $O(n)$ which is still slower than $O(\log n)$.

Trips for the user are simply the unclustered portion between two clusters. An exemplary algorithm to find these segments is given in the algorithm shown in FIG. 10 that runs in $O(\log n)$. As with the trips, a spatial record can be created and inserted by constructing a geospatial string from the (lat, long) pairs of each point.

The method of the present invention is able too rapidly analyze raw GNSS position data and identify Points-of-Interest (POIs) (i.e., clusters), or locations where a tracked user or object pauses for a significant amount of time and segment travel behavior into user trips from one POI to another. This method of the present invention uses AVL trees to merge clusters in logarithmic running time, and maintain an $O(n)$ memory storage requirement during execution. The method of the present invention also maintains GNSS data ordered by the time of the position fix within a cluster to aid in rapid extraction of travel information such as arrivals and departures from POIs.

The main benefit of Fast GNSS is its space saving property but from the clusters it generates the maximum and minimum elements can be retrieved in $O(\log n)$ time which could be useful for creating a user's travel history. Fast GNSS Clustering is also capable of merging disjoint ambiguously-related trees when no exact relationship exists. An ambiguous relationship would occur when (part of) the range of time of one cluster/tree overlaps the range of time of the other cluster. Two clusters would be merged when they are disjoint, and the distance between two points in a pair from the Cartesian product of their points is less than a distance c. As a result of using AVL trees, the relationships among the points within a cluster are an implicit property of the cluster itself rather than the responsibility of the proximity matrix that is commonly used in hierarchical clustering.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of generating a travel history for a user from a set of global navigation satellite system (GNSS) data for the user, the method comprising:
acquiring a set of time-stamped GNSS data recorded by a user's mobile device, the time-stamped GNSS data comprising spatial and temporal information;
defining a plurality of temporarily ordered points-of-interest (POI) for the user based upon the acquired set of time-stamped GNSS data, wherein each of the plurality of POIs defines a spatial dimension where the user has stopped for a significant amount of time; and
identifying a plurality of trips taken by the user between the plurality of defined POIs to generate a travel history for the user, wherein each of the plurality of trips originates and terminates at one of the plurality of POIs and wherein each of the plurality of trips defines a spatial and temporal property for movement between two of the plurality of POIs.

2. The method of claim 1, wherein defining a plurality of temporarily-ordered POIs for the user based upon the set of time-stamped GNSS data, further comprises:
representing the set of time-stamped GNSS data as a plurality of temporarily ordered balanced binary trees;
determining a minimum distance in the Cartesian product of a first binary tree and a second binary tree of the plurality of balanced binary trees;
merging the first binary tree and the second binary tree if the minimum distance is less than a predetermined value; and
repeating the steps of determining a minimum distance and merging the binary trees to define the plurality of temporarily-ordered POI's.

3. The method of claim 2, wherein the merging is performed in logarithmic running time, maintaining a O(n) memory storage requirement.

4. The method of claim 2, wherein the first binary tree and the second binary tree are disjointed.

5. The method of claim 2, wherein the first binary tree and the second binary tree are disjointed and ambiguously-related, wherein the first binary tree and the second binary tree are ambiguously-related if a portion of a time-stamped data range of the second binary tree overlaps a time-stamped data range of the first binary tree.

6. The method of claim 1, wherein identifying a plurality of trips taken by the user further comprises identifying a maximum time-stamp and a minimum time-stamp for each of the plurality of POIs.

7. The method of claim 6, wherein identifying a maximum time-stamp and a minimum time-stamp for each of the plurality of POIs is performed in O(log n) time.

8. The method of claim 2, wherein merging the first binary tree and the second binary tree if the minimum distance is less than a predetermined value further comprises:
identifying an overlapping time range common to the first binary tree and the second binary tree; and
removing the time-stamped GNSS data from the second binary tree prior to merging the first binary tree and the second binary tree.

9. The method of claim 1 further comprising, identifying at least one pseudo-POI within the plurality of POIs.

10. The method of claim 1 further comprising, inserting a record into a spatial database that represents the travel history of the user.

11. A non-transitory computer readable storage medium having a method encoded thereon, the method comprising:
generating a travel history for a user from a set of global navigation satellite system (GNSS) data for the user, the method comprising:
acquiring a set of time-stamped GNSS data recorded by a user's mobile device, the time-stamped GNSS data comprising spatial and temporal information;
defining a plurality of temporarily ordered points-of-interest (POI) for the user based upon the acquired set of time-stamped GNSS data, wherein each of the plurality of POIs defines a spatial dimension where the user has stopped for a significant amount of time; and
identifying a plurality of trips taken by the user between the plurality of defined POIs to generate a travel history for the user, wherein each of the plurality of trips originates and terminates at one of the plurality of POIs and wherein each of the plurality of trips defines a spatial and temporal property for movement between two of the plurality of POIs.

12. The non-transitory computer readable storage medium of claim 11, wherein defining a plurality of temporarily-ordered POIs for the user based upon the set of time-stamped GNSS data, further comprises:
representing the set of time-stamped GNSS data as a plurality of temporarily ordered balanced binary trees;
determining a minimum distance in the Cartesian product of a first binary tree and a second binary tree of the plurality of balanced binary trees;
merging the first binary tree and the second binary tree if the minimum distance is less than a predetermined value; and
repeating the steps of determining a minimum distance and merging the binary trees to define the plurality of temporarily-ordered POI's.

13. The method of claim 12, wherein the merging is performed in logarithmic running time, maintaining a O(n) memory storage requirement.

14. The non-transitory computer readable storage medium of claim 12, wherein the first binary tree and the second binary tree are disjointed.

15. The non-transitory computer readable storage medium of claim 12, wherein the first binary tree and the second binary tree are disjointed and ambiguously-related, wherein the first binary tree and the second binary tree are ambiguously-related if a portion of a time-stamped data range of the second binary tree overlaps a time-stamped data range of the first binary tree.

16. The non-transitory computer readable storage medium of claim 11, wherein identifying a plurality of trips taken by the user further comprises identifying a maximum time-stamp and a minimum time-stamp for each of the plurality of POIs.

17. The non-transitory computer readable storage medium of claim 16, wherein identifying a maximum time-stamp and a minimum time-stamp for each of the plurality of POIs is performed in O(log n) time.

18. The non-transitory computer readable storage medium of claim 12, wherein merging the first binary tree and the second binary tree if the minimum distance is less than a predetermined value further comprises:
identifying an overlapping time range common to the first binary tree and the second binary tree; and
removing the time-stamped GNSS data from the second binary tree prior to merging the first binary tree and the second binary tree.

19. The non-transitory computer readable storage medium of claim 11, further comprising, identifying at least one pseudo-POI within the plurality of POIs.

20. The non-transitory computer readable storage medium of claim 11, further comprising, inserting a record into a spatial database that represents the travel history of the user.

21. A computer system comprising:
a central processing unit for generating a travel history for a user from a set of global navigation satellite system (GNSS) data for the user by acquiring a set of time-stamped GNSS data recorded by a user's mobile device, the time-stamped GNSS data comprising spatial and temporal information, defining a plurality of temporarily ordered points-of-interest (POI) for the user based upon the acquired set of time-stamped GNSS data, wherein each of the plurality of POIs defines a spatial dimension where the user has stopped for a significant amount of time and identifying a plurality of trips taken by the user between the plurality of defined POIs to generate a travel history for the user, wherein each of the plurality of trips originates and terminates at one of the plurality of POIs and wherein each of the plurality of trips defines a spatial and temporal property for movement between two of the plurality of POIs; and a memory unit coupled to the central processing unit, the memory unit having a an O(n) memory storage requirement.

\* \* \* \* \*